United States Patent [19]
Schmidt et al.

[11] Patent Number: 5,589,984
[45] Date of Patent: Dec. 31, 1996

[54] OVAL ELLIPTICAL MIRROR

[75] Inventors: William P. Schmidt, Rockwood; Franklin D. Hutchinson, New Boston, both of Mich.

[73] Assignee: Mirror Lite of North Carolina, Shallotte, N.C.

[21] Appl. No.: 341,665

[22] Filed: Nov. 17, 1994

Related U.S. Application Data

[62] Division of Ser. No. 942,294, Sep. 9, 1992.

[51] Int. Cl.$^6$ .............................. G02B 5/08; G02B 5/10; G02B 7/182; B60R 1/06
[52] U.S. Cl. .................. 359/603; 359/604; 359/838; 359/868; 359/872
[58] Field of Search .......................... 359/838, 839, 359/868, 869, 871, 872, 603, 604

[56] References Cited

U.S. PATENT DOCUMENTS

| | | | |
|---|---|---|---|
| 1,437,850 | 12/1922 | La Hodny | 359/838 |
| 1,467,350 | 9/1923 | Abbott | 359/868 |
| 1,811,823 | 6/1931 | Horton | 359/603 |
| 1,885,153 | 11/1932 | Stewart | 359/868 |
| 2,390,424 | 12/1945 | Colbert | 359/603 |
| 2,881,655 | 4/1959 | Eisenschink | 359/603 |
| 3,901,587 | 8/1975 | Haile | 359/868 |
| 4,436,372 | 3/1984 | Schmidt et al. | 359/868 |
| 4,500,063 | 2/1985 | Schmidt et al. | 248/475.1 |
| 4,730,914 | 3/1988 | Stout | 359/868 |
| 4,804,257 | 2/1989 | Schmidt et al. | 350/626 |
| 4,822,157 | 4/1989 | Stout | 359/868 |
| 4,834,521 | 5/1989 | Dubs | 359/838 |
| 4,938,578 | 7/1990 | Schmidt et al. | 359/868 |
| 5,005,963 | 4/1991 | Schmidt et al. | 359/868 |
| 5,084,735 | 1/1992 | Albers et al. | 359/868 |
| 5,084,785 | 1/1992 | Albers et al. | 359/868 |
| 5,106,049 | 4/1992 | Schmidt et al. | 248/487 |
| 5,116,013 | 5/1992 | Malcolmson | 248/484 |
| 5,307,211 | 4/1994 | Schmidt et al. | 359/868 |

FOREIGN PATENT DOCUMENTS 2143022  3/1973  Germany .................. 359/838

*Primary Examiner*—Ricky D. Shafer
*Attorney, Agent, or Firm*—Weintraub, DuRoss & Brady

[57] ABSTRACT

An oval elliptical mirror assembly with a generally convex reflective surface having a long axis and a short axis essentially normal to the long axis. The oval shape is provided to increase the field-of-view for a user along the long axis. The mirror assembly may be mounted on a flat mounting surface, such as a walls, or a varied mounting surface, such as the external surface of a vehicle. The mirror is mounted with the long axis positioned at any angle to provide for the desired field-of-view.

9 Claims, 2 Drawing Sheets

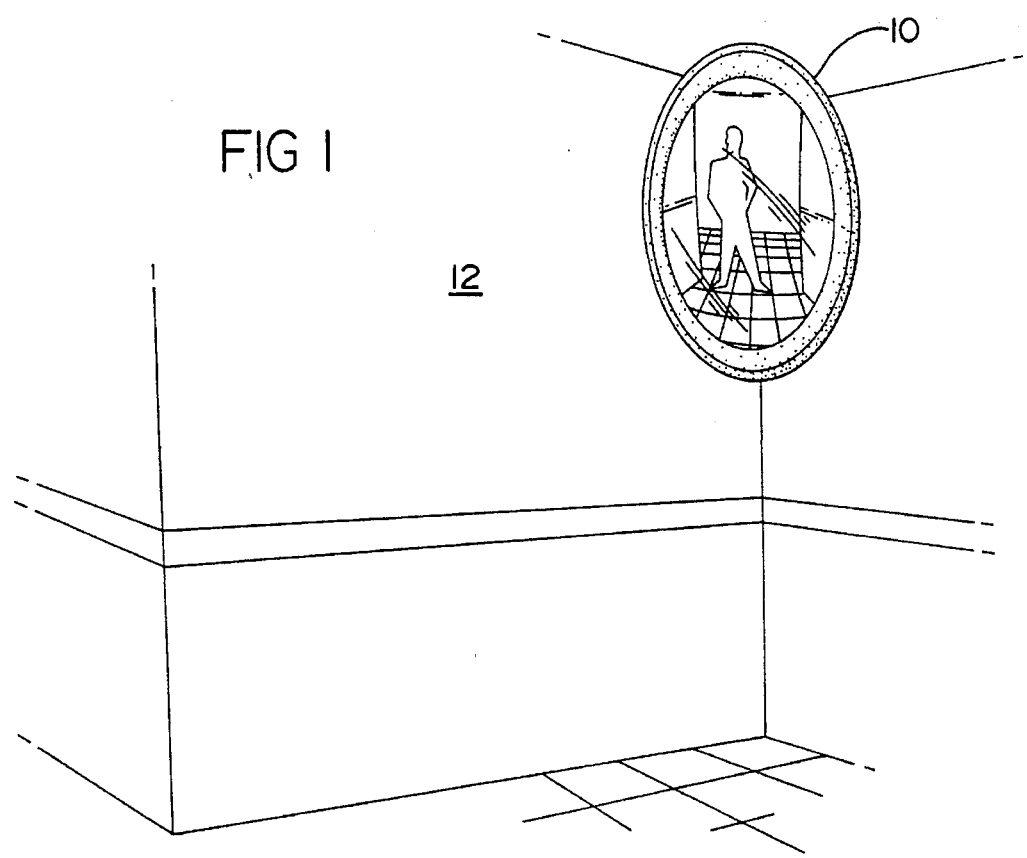
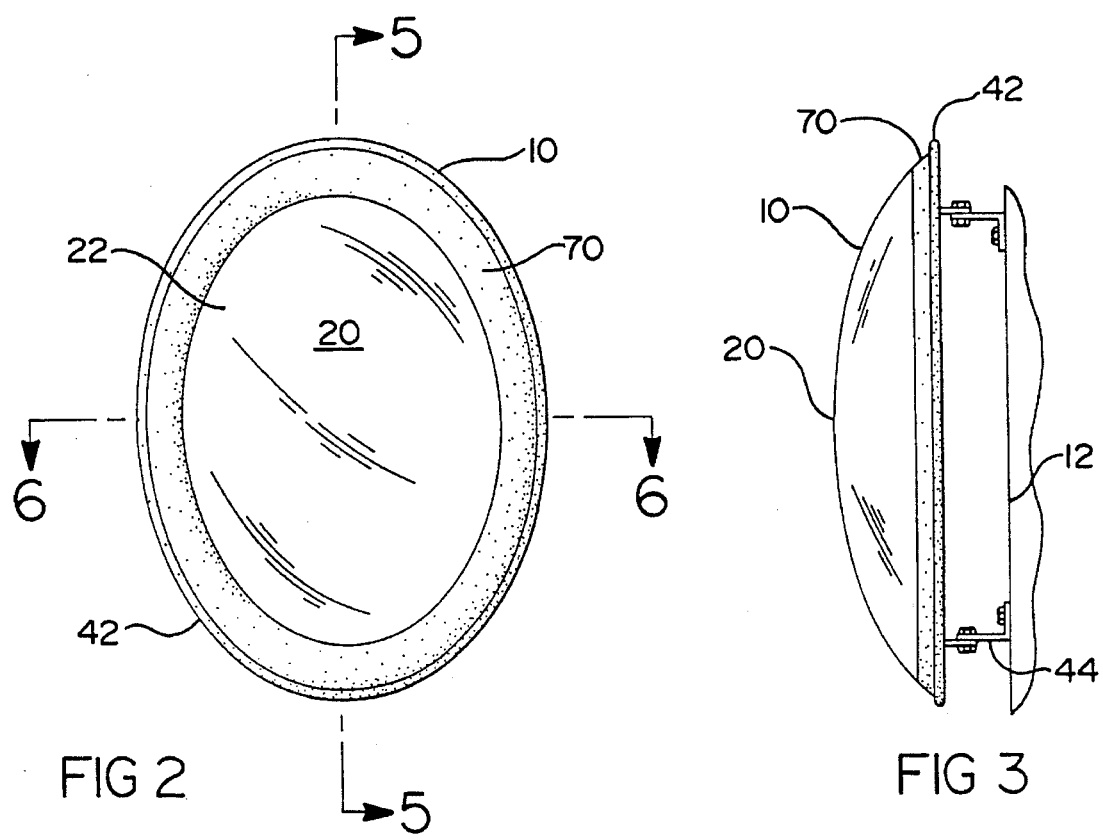

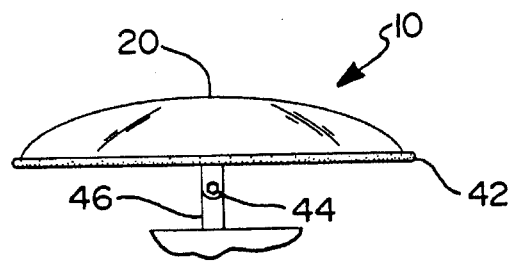
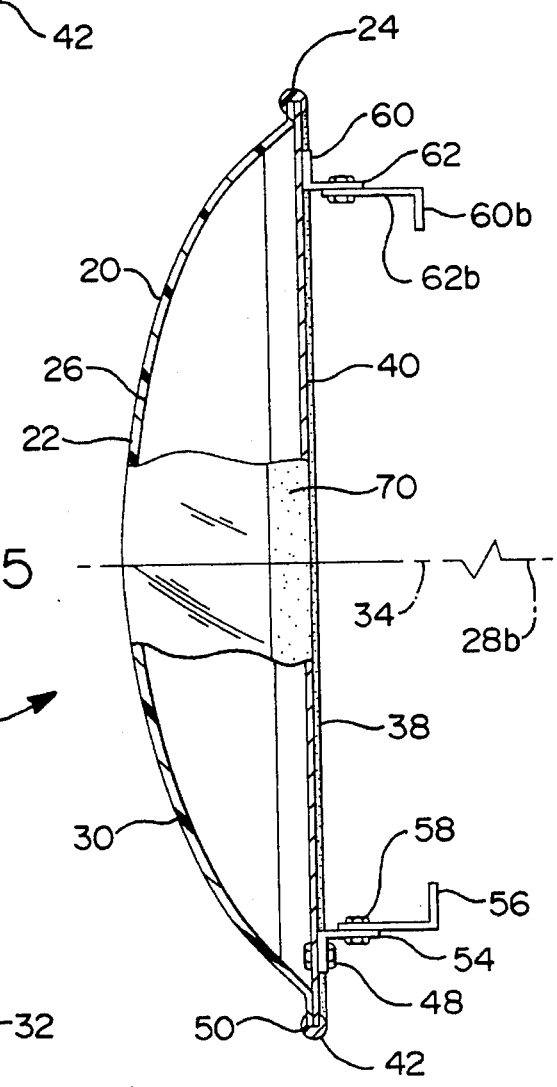
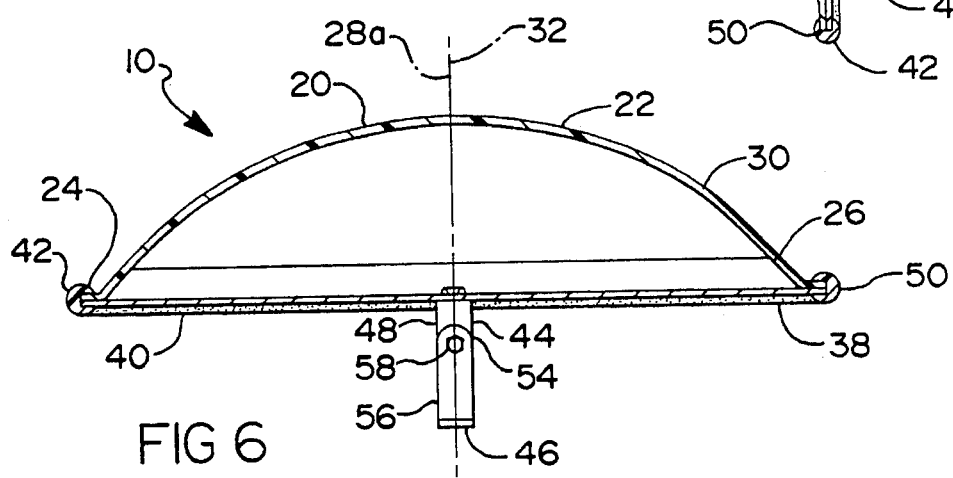

5,589,984

OVAL ELLIPTICAL MIRROR

This is a divisional of co-pending application Ser. No. 07/942,294, filed Sep. 9, 1992 still pending.

BACKGROUND OF INVENTION

1. Field of Invention

The present invention relates to mirrors. More particularly, the present invention relates to oval elliptical mirrors.

2. Description of Prior Art

The use of wide field of view mirrors to observe areas not easily viewed from a stationary post or position is long established in the art. The traditional shape of such mirrors has been circular with the surface or lens of the mirror being convex. Another popular shape, although less traditional, has been a rectangular wide field of view mirror having a convex lens or reflective mirror surface.

As is known, the basic convex surface was created to provide viewing of a wide area and to reduce it to an image easily viewed by the person occupying the stationary post or position. However, the traditional convex mirror surface area coverage, whether it is a circular or a rectangular mirror, is limited by the edge or size or outer perimeter of the mirror. To increase the area of viewing coverage one must necessarily increase the size of the mirror. Clearly, the mirror size eventually reaches a point where it is not feasible to use.

Hence, attempts have been made in the art to provide a bigger and wider viewing area by flattening the center of the mirror and rounding the edges. However, this results in a distorted viewing image which renders such a mirror difficult to use.

Thus, a mirror which would be smaller and easier to handle and position while still providing an increased field of view would be highly desirable. It is to this to which the present invention is directed.

SUMMARY OF INVENTION

The present invention provides a generally oval elliptical mirror lens and assembly therefore. The assembly generally comprises:

a) an oval mirror lens, the mirror lens being substantially convex, the mirror lens being an ellipsoid with a first major axis and a minor axis, the minor axis being different from the first major axis, the mirror lens having a reflective surface and a rear surface;

(b) means for supporting the mirror lens; and (c) means for mounting the mirror mounting to a surface connected to the means for supporting.

The mirror lens, per se, is oval shaped with the longer axis of the oval corresponding with the first major axis and the shorter axis of the oval corresponding with the minor axis. The shorter axis is essentially normal to the longer axis. The mirror lens has varying radii of curvature along the axes.

The means for supporting the lens generally urges against the edges of the rear surface of the mirror lens. The means for supporting and the mirror lens are fixedly secured to each other by a gasket or the like. The means for supporting is removably connected to the means for mounting the mirror assembly to a mounting surface. The mounting surface will dictate the type of mounting employed. For example, when mounting the assembly to a wall or the like, a first fastener such as a nut and bolt fastens the means for mounting to the means for supporting. A second fastener which may be a screw or the like fixedly attaches the mirror assembly to the mounting surface.

Where the mirror is used on or in a vehicle, such as school bus, truck, or the like, other suitable mounting members may be employed.

The mirror lens may be positioned with the long or first major axis vertically. This provides an extended field-of-viewing from the top to bottom. Also the longer major axis may be positioned horizontally. This provides an extended field-of-viewing from side to side. Further, the longer or first major axis of the mirror may be positioned at any angle between vertical and horizontal.

The various features, advantages, and other uses of the present invention will become more apparent by referring to the following detailed description and drawings. Throughout the detailed description and drawings, identical reference numbers are used to refer to the same components shown in the multiple figures, in which:

BRIEF DESCRIPTION OF DRAWINGS

FIG. 1 is a perspective view of the mirror of the present invention depicted in a first environment;

FIG. 2 is a front elevational view of the mirror hereof;

FIG. 3 is a side elevational view of the mirror;

FIG. 4 is a plan view of the mirror with a traditional mounting;

FIG. 5 is a cross sectional view of the mirror taken along 5—5 of FIG. 2; and

FIG. 6 is a sectional view taken along line 6—6 of FIG. 2.

DETAILED DESCRIPTION

Referring now to FIGS. 1–6, there is depicted therein an embodiment of the instant invention showing an oval elliptical mirror generally, denoted at 10. The oval elliptical mirror 10 hereof, generally, comprises:

(a) an oval mirror lens 20, the lens 20 being substantially convex, the lens being an ellipsoid 30 with a first major axis 32 and a minor axis 34, the minor axis 34 being different from the first major axis 32, the mirror lens 20 having a reflective surface 22 and a rear surface 26;

(b) means 38 for supporting the mirror lens 20; and (c) means 44 for mounting the mirror 10 to a mounting surface 12.

The mirror lens 20, as noted, is oval-shaped with a first or long axis 28a corresponding to the first major axis 32 and a second or short axis 28b corresponding to the minor axis 34. The reflective surface 22 is defined by an edge or perimeter 24 which surrounds the reflective surface 22.

As shown in FIGS. 5 and 6 the mirror lens 20 is, preferably, an ellipsoid 30 with varying radii along both the first major axis 32 the minor axis 34. Generally, the mirror lens 20 has a shorter radius proximate the perimeter and a larger radius proximate the intersection of the two major axes 32, 34. The varying radius mirror lens 20 provides an even extended field-of-view than a continuous radius mirror lens.

The mirror lens 20 includes a non-reflective rear surface 26 which is also defined by the perimeter 24. The rear surface 26 of the mirror lens 20 is urged against the means 38 for supporting the mirror lens 20 proximate the perimeter 24.

The mirror lens 20 may also include an opaque band 70 integrally formed with the reflective surface and surrounding the reflective surface. FIGS. 1–3 and 5–6 employ the opaque band 70 such as that disclosed in copending application entitled, "Extended Field of View Mirror", filed on evendate herewith, the disclosure of which is hereby incorporated herein. The opaque band is used to eliminate the interference the mirror gasket causes when reflected from the mirror and to extend the field of view.

The means 38 for supporting the mirror lens 20 preferably comprises a mounting frame 40. The mounting frame 40, generally, corresponds to the oval shape of the mirror lens 20. The mounting frame 40 is preferably made from metal, but may be made from plastic or the like. In use, and as noted, the perimeter of the frame 40 abuts the perimeter 24 of the lens 20 to provide contact therebetween. A gasket 42 is mounted about the periphery of the lens and frame to secure the mirror lens to the frame. The gasket 42 is, generally, a flexible material made from rubber, plastic, or the like. The gasket 42 is, essentially, an oval shaped ring 50 having a substantially circular cross section. The ring 50 has a U-shaped slot 52 formed therein. The perimetral edge 24 of the mirror lens 20 and the edge of the frame 40 are removably insertable into the U-shaped slot 52 to secure the lens to the mounting frame. An adhesive or other bonding agent may be deployed in the slot to further secure the interconnection between the frame and the lens.

The means 44 for mounting the mirror assembly 10 to a mounting surface such as a wall, 12 preferably, comprises a mounting bracket 46 adapted to secure the mirror to the intended mounting surface. At least one mounting bracket 46, preferably two, is removably fastened to the means 38 for supporting by a means 48 for fastening. The means 48 for fastening may be a nut or a bolt or the like.

The mounting bracket 46 is preferably made from metal, but may be made from plastic or the like. The mounting bracket 46 is comprised of a first L-shaped portion 54, a second L-shaped portion 56 removably connected to the first L-shaped portion 54, and a means 58 for pivotally attaching the L-shaped portions 54, 56.

The first L-shaped portion has a first leg 60 and a second leg 62 substantially normal to the first leg 60. A hole (not shown) is formed in the first leg for receiving a fastener and a second hole (not shown) is formed in the second leg 62 for receiving the means 58 for pivotally attaching in the second leg 62. The second L-shaped portion is essentially identical to the first L-shaped portion 54 and is reciprocally attached to the first L-shaped portion 54.

The means 58 for pivotally attaching, preferably, comprises an adjustable and removable fastener, such as a nut and bolt. However a non-removable fastener such as a pin may also be used. The means 58 for pivoting is insertable into the holes in the second legs 62 of the L-shaped portions 54, 56. The first and second L-shaped portions 54,56 pivot about the means 58 to provide for adjustment for the mirror assembly when mounted to the mounting surface 12.

The mirror assembly 10 may also be mounted to either the exterior and/or interior of a vehicle such as a school bus, van, truck or like. Any suitable means for mounting the mirror assembly 10 to a vehicle may be used herein. Advantageously for exterior use the mirror mounts disclosed and claimed in U.S. Pat. No. 4,804,257, entitled "Vibration Dampened Mirror Apparatus", U.S. Pat. No. 4,500,063 entitled "Fender Mount for Mirror", U.S. Pat. No. 5,106,063, entitled "Vehicle Mounting Assembly", U.S. Pat. No. 4,116,013, entitled "Mounting Mechanism"; U.S. Pat. No. 5,116,013, entitled "Mounting Mechanism" and in copending U.S. patent application Ser. Nos. 07/843,508 filed Feb. 28, 1992 and 07/870,522 filed Mar. 17, 1992, the disclosures of which are hereby incorporated by reference, may be used. For vehicular interior use, bracketry such as that for a wall mounting may be used.

As noted, in use, the mirror assembly 10 may be used as an internal or external mirror for passenger buses, motor homes, etc. and other limited view areas within buildings and other type structures. The mirror assembly 10 may also be used for outside security purposes.

The oval mirror assembly 10 may be mounted or positioned with the long axis or first major axis vertical to the ground or floor. This provides for an extended field-of-view from top to bottom. Also, the mirror assembly may be mounted or positioned with the long axis or first major axis horizontal to the floor or ground. This, then, provides an extended field-of-view from side to side. Further, it may be desirable to position or mount the mirror assembly with the long axis or first major axis at any angle within a 360° positioning range. The specific need will dictate the method of mounting and positioning the mirror.

Having, thus, described the present invention, what is claimed is:

1. A mirror assembly, comprising:
   (a) a mirror lens having a reflective outer surface and a non-reflective rear surface, the mirror lens comprising a mirror body which terminates in an oval perimetral edge, the edge surrounds the reflective surface and the non-reflective surface of the mirror lens, the mirror body being a substantially convex ellipsoid having a major axis and a minor axis which intersects with the major axis, the major axis having a varying radius of curvature, which radius decreases from the intersection with the minor axis to the perimetral edge.

2. The assembly of claim 1 which further comprises:
   (a) means for supporting the mirror lens; and
   (b) means for mounting the mirror lens to a mounting surface.

3. The mirror assembly of claim 2 wherein the means for supporting the mirror comprises:
   (a) a mounting frame, the mounting frame abutting against the edge of the non-reflective surface of the lens, the mounting frame having at least one hole formed therein for receiving a fastener for the means for mounting the mirror assembly, and
   (b) a gasket, the gasket securing the mirror lens to the mounting frame.

4. The mirror assembly of claim 2 wherein the means for mounting the mirror assembly to a mounting surface comprises a mounting bracket, the mounting bracket comprising:
   (a) a first L-shaped portion, the first L-shaped portion having a first leg, and a second leg substantially normal thereto; the first leg having a first hole formed therein for a fastener, the second leg having a second hole formed therein;
   (b) a second L-shaped portion substantially similar to the first L-shaped portion the second L-shaped portion reciprocally and pivotally attached to the first L-shaped portion;
   (c) means for pivotally attaching the first L-shard portion to the second L-shaped portion; and
   (d) a removable fastener, the fastener attaching the second L-shaped portion to a mounting surface.

5. The mirror assembly of claim 4, wherein the means for pivotally attaching the first L-shaped portion to the second L-shaped portion is an adjustable fastener.

6. The mirror assembly of claim 2 wherein:
   the means for mounting comprises means for mounting the assembly to the exterior of a vehicle.

7. The mirror assembly of claim 1 wherein the minor axis has a varying radius of curvature.

8. The mirror assembly of claim 7 wherein the minor axis has its minimum radius of curvature at the perimetral edge.

9. The mirror assembly of claim 1 further comprising:

an opaque band integrally formed with the reflective surface and depending therefrom, the opaque band substantially surrounding the entire reflective surface.

* * * * *

(12) EX PARTE REEXAMINATION CERTIFICATE (6659th)
United States Patent
Schmidt et al.

(10) Number: US 5,589,984 C1
(45) Certificate Issued: Feb. 17, 2009

(54) OVAL ELLIPTICAL MIRROR

(75) Inventors: William P. Schmidt, Rockwood, MI (US); Franklin D. Hucthinson, New Boston, MI (US)

(73) Assignee: Mirror Lite of North Carolina, Shallotte, NC (US)

Reexamination Request:
No. 90/008,741, Aug. 9, 2007

Reexamination Certificate for:
Patent No.: 5,589,984
Issued: Dec. 31, 1996
Appl. No.: 08/341,665
Filed: Nov. 17, 1994

Related U.S. Application Data

(62) Division of application No. 07/942,294, filed on Sep. 9, 1992, now abandoned.

(51) Int. Cl.
*G02B 05/08* (2006.01)
*G02B 05/10* (2006.01)
*G02B 07/182* (2006.01)
*B60R 01/06* (2006.01)

(52) U.S. Cl. .................. 359/603; 359/604; 359/838; 359/868; 359/872

(58) Field of Classification Search .................. None
See application file for complete search history.

(56) References Cited

U.S. PATENT DOCUMENTS

| 3,350,048 | A | | 10/1967 | Wheeler |
| 3,832,039 | A | | 8/1974 | Doolittle |
| 4,106,919 | A | * | 8/1978 | Lagerdahl .............. 96/90 |
| 4,264,144 | A | * | 4/1981 | McCord .............. 359/868 |
| 4,436,372 | A | | 3/1984 | Schmidt et al. |
| 4,978,207 | A | | 12/1990 | Gillner et al. |

FOREIGN PATENT DOCUMENTS

| DE | 1921076 | 11/1970 |
| DE | 313216 | 4/1989 |
| JP | 62-105103 | 5/1987 |
| JP | 64-42063 | 3/1989 |
| SE | 98218 | 2/1940 |

OTHER PUBLICATIONS

South, Nanette; Monolithic Dome Institute Radius of Curvature, pp. 1–4.*
Rosco School Bus Mirror Products Catalog (May 1992).

* cited by examiner

*Primary Examiner*—Glenn K. Dawson

(57) ABSTRACT

An oval elliptical mirror assembly with a generally convex reflective surface having a long axis and a short axis essentially normal to the long axis. The oval shape is provided to increase the field-of-view for a user along the long axis. The mirror assembly may be mounted on a flat mounting surface, such as a walls, or a varied mounting surface, such as the external surface of a vehicle. The mirror is mounted with the long axis positioned at any angle to provide for the desired field-of-view.

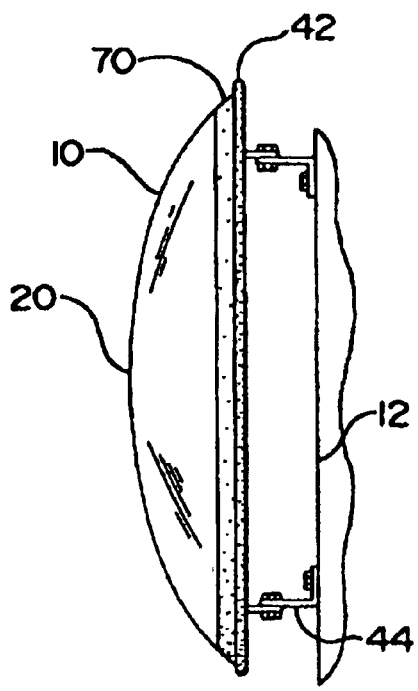

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *